United States Patent Office 2,959,611
Patented Nov. 8, 1960

2,959,611

FLUOROALKYL CHLOROCARBONATES AND CARBAMATES

Jerry A. Nelson, Newark, Del., Thomas G. Miller, Easton, Pa., and Kenneth C. Smeltz, Wilmington, Del., assignors to E. I. du Pont de Nemours & Company, Wilmington, Del., a corporation of Delaware No Drawing. Filed Jan. 21, 1959, Ser. No. 788,065

2 Claims. (Cl. 260—463)

This invention relates to novel organic compounds. It is an object of this invention to produce novel compounds which are useful as intermediates for the production of oil- and water-repellent agents, and in similar fields. Other objects and achievements of this invention will appear as the description proceeds.

More particularly, this invention deals with novel perfluorocarbamates, which may be expressed by the general formula $$X(CF_2)_nCH_2O\text{—}CONH_2 \qquad (1)$$

wherein X is hydrogen or a halogen atom, e.g. Cl or F, and $n$ is an integer from 7 to 12. As a further aspect thereof, this invention embraces a group of novel perfluorochloroformates, of the general formula $$X(CF_2)_nCH_2O\text{—}COCl \qquad (2)$$

wherein X and $n$ have the same significance as above, and which serve as intermediate materials for producing said perfluorocarbamates.

In general outline, we produce said novel chloroformates by reacting the corresponding fluoroalcohols of formula $X\text{—}(CF_2)_n\text{—}CH_2OH$ with phosgene. We then react the resulting chloroformates with ammonia to produce said carbamates.

The requisite initial fluoroalcohols are known compounds and are generally prepared by one of two methods, depending on the nature of X. When X is hydrogen, the compounds are prepared by telomerization of tetrafluoro ethylene, using methanol as telogen. This process is described more fully in U.S.P. 2,559,628 and results in a mixture of alcohols having the formula $$H(CF_2)_n\text{—}CH_2OH \qquad (3)$$

wherein $n$ varies by twos from 2 to 24. These mixtures are separated by distillation or similar methods into various intermediate fractions or into the individual components. For our present invention, the individual components wherein $n$ varies from 8 to 12 are preferred, but various mixtures thereof may also be used.

When X is halogen, the alcohol compounds are prepared by reducing the corresponding carboxylic acids of formula $$Z(CF_2)_n\text{—}COOH \qquad (4)$$

wherein Z is a halogen atom (Cl or F) and $n$ is an integer from 7 to 12. The reduction is achieved by the aid of lithium aluminum hydride and is described more fully in U.S.P. 2,666,797.

Here too, the mixture of alcohols of various n-values can be separated, if desired, by such methods as steam distillation, fractional distillation or fractional crystallization, but such separation is not essential to the objects of this invention.

The reaction between the chosen fluoroalcohol and phosgene, according to this invention, is preferably carried out in an inert liquid organic solvent system. As solvent is chosen a liquid which dissolves the reactants and product, but does not dissolve the tertiary amine hydrochloride which is formed during the process. Suitable inert liquid solvents which may be used are the ethers such as diethyl ether, tetrahydrofuran, etc., ketones such as acetone, methyl ethyl ketone, etc., esters such as ethyl acetate, etc. The preferred solvent is ethyl acetate.

The reaction is preferably carried out under anhydrous conditions because of the reactivity of phosgene with water and water vapor. This is readily achieved by blanketing the reaction mass with nitrogen, helium or other inert gas. The temperature of the reaction is preferably between about −20° C. and 30° C. Temperatures below −20° C. can be used, but are impractical from a commercial standpoint, while temperatures above +30° C. cause side reactions, giving rise to carbonates rather than chloroformates. Such carbonate formation is, nevertheless, not a total loss, inasmuch as the carbonates, too, react readily with ammonia to give the desired carbamates, except that half of their molecule is wasted on regeneration of the original alcohol.

As indicated, in carrying out the above reaction it is necessary to use an acid acceptor. Normally the acid acceptor will be a tertiary nitrogenous base, and it is conveniently added to the reaction medium containing dissolved phosgene and fluoroalcohol as a solution in the inert solvent being used. Preferably, pyridine will be used as the acceptor, but tertiary amines such as triethyl amine, diethylcyclohexylamine and the like may also be employed.

The amount of acid acceptor used will depend upon the amount of reagents taken, since sufficient nitrogenous base should be present to react with the by-product HCl that is formed. Thus, a molar equivalent of the base for the amount of fluoroalcohol taken is preferably used. In an alternate procedure, however, the by-product HCl gas may be swept from the reaction mass with nitrogen or other inert gas and when this procedure is employed, less than a molar equivalent of the acid acceptor may be used (e.g. about 0.1 mole equivalent).

The reaction proceeds smoothly as the reactants are agitated, and the tertiary amine hydrochloride formed separates out. When the reaction is completed, the insoluble amine hydrochloride is filtered off, and the chloroformate is obtained by distilling off the inert solvent.

Among the compounds successfully produced by us according to the aforegoing reaction, may be named:

1,1-dihydro-perfluorooctyl chloroformate,
1,1,9-trihydro-perfluorononyl chloroformate,
1,1-dihydro-11 - chloro-perfluoroundecyl chloroformate,
1,1,11-trihydro-perfluoroundecyl chloroformate,
1,1-dihydro-perfluorododecyl chloroformate, and
1,1,13-trihydro-perfluorotridecyl chloroformate.

These compounds are white plate-like solids having sharp melting points; they are soluble in common inert organic solvents (such as acetone, tetrahydrofuran, chloroform, benzene, ethyl acetate and diethyl ether) and may be crystallized from their solutions in aliphatic or cycloaliphatic hydrocarbons.

The reaction of our novel chloroformates with ammonia to produce the corresponding carbamates, according to this invention, is generally carried out likewise in an anhydrous solvent system. The reaction may be expressed by the following equation:

$$X(CF_2)_nCH_2O\text{—}COCl + 2NH_3 \rightarrow \\ X(CF_2)_nCH_2O\text{—}CONH_2 + NH_4Cl \qquad (5)$$

Gaseous ammonia is simply bubbled into an organic solvent solution of the chloroformate and reaction occurs. The temperature of the reaction is not critical and convenient temperatures between about 5° and 50° C. may be used. This ammonium chloride that is formed is filtered off, and the organic solvent is distilled off at reduced pressure. The white solid distillation residue is the carbamate product and may be purified by crystallization from ethanol, benzene or chloroform.

As already indicated, any bis-fluorocarbonate formed in the phosgenation step will also react with ammonia in the second step. The reaction in this case may be expressed by the equation

$$X(CF_2)_nCH_2O-CONH_2 + X(CF_2)_nCH_2OH \quad (6)$$

Although this route to the carbamate is not so economical as the one indicated in Equation 5 above, in view of the by-product regeneration of the initial alcohol, it may nevertheless be used as the principal process, if desired, by carrying out the phosgenation at a temperature above 30° C., whereby to increase the proportion of carbonate produced in that step.

The organic solvents in which the reaction with ammonia occurs will generally be selected from those that are inert to both reactants and products. The selection of the solvent is not otherwise critical, and any of a wide variety of conventional organic solvents may be used. These may be selected from the classes of linear and cyclic ethers such as diethyl ether, dibutyl ether, dioxane, tetrahydrofuran, and the like; aliphatic, cycloaliphatic and aromatic hydrocarbons such as n-hexane, cyclohexane, benzene, toluene, xylene, etc.; halogenated and nitrated hydrocarbons such as chlorobenzene, nitrobenzene, and the like. The preferred solvent is tetrahydrofuran.

These novel fluoroalkyl carbamates are colorless, flat, plate-like crystals having sharp melting points. The compounds are insoluble in water, but are generally soluble in organic solvents; e.g., aromatic hydrocarbons, halogenated hydrocarbons, alcohols, ketones, etc.

Among the novel perfluoroalkyl carbamates prepared by us according to the above process (Equation 5), may be mentioned:

1,1-dihydro-perfluorooctyl carbamate,
1,1,9-trihydro-perfluorononyl carbamate,
1,1-dihydro-11-chloro-perfluoroundecyl carbamate,
1,1,11-trihydro-perfluoroundecyl carbamate and
1,1,13-trihydro-perfluorotridecyl carbamate.

Mixtures of the above carbamates may be produced, by starting initially with mixtures of alcohols of various n-values, or even of various X-values, if desired.

Without limiting this invention, the following examples are given to illustrate our preferred mode of operation.

*Example 1—1,1,11-trihydro-perfluoroundecyl chloroformate*

A solution of 135 g. of phosgene in 400 ml. of dry ethyl acetate was adjusted to 25° to 30° C., and a solution of 240 g. of 1,1,11-trihydro-perfluoroundecanol in 125 ml. of ethyl acetate was quickly added. A mixture of 38 ml. of pyridine and 35 ml. of ethyl acetate was added gradually, and the reaction mixture was then stirred at 25° to 30° C. for one hour. The excess phosgene was removed by passing nitrogen through the reaction mixture. The slurry was then cooled to −10° to 0° C. and filtered to remove solid pyridine hydrochloride. Upon vacuum distillation of the filtrate at 25° to 30° C., the crude chloroformate was isolated as a white waxy solid containing 90% of the theoretical amount of hydrolyzable chlorine calculated for $H(CF_2)_{10}CH_2O-CO-Cl$. The product was distilled at 86.5° C. at 0.5 mm., and recrystallized from hexane, yielding a product of melting point 59.5°–60° C.

*Example 2—1,1-dihydro-perfluorooctyl chloroformate*

To 400 ml. of ethyl acetate, cooled to −10° C., was added 148.5 g. of phosgene. A solution of 200 g. of 1,1-dihydro-perfluorooctyl alcohol in 212 ml. of ethyl acetate was added rapidly to the reaction flask. The mixture was warmed to 28° to 30° C., a mixture of 39.5 g. of dry pyridine and 40 ml. of ethyl acetate was stirred in, and the mixture was then agitated for one hour at 28° to 30° C. The mixture was cooled to −10° C., and the excess phosgene was scrubbed off, by passing nitrogen gas through the reaction mixture while warming to room temperature.

The slurry was filtered under an atmosphere of nitrogen, and the filtrate was distilled off under reduced pressure (4 mm. Hg), using a bath temperature of 28° to 30° C.

The residual product was distilled through a fractionating column. The main cut, 182 g., distilled at 38° to 43° C. at 0.2 mm. This cut was found to have 7.47% hydrolyzable chlorine (8.87% is theory). The infrared spectrum showed a strong single peak at 5.63μ. This is in the expected region for carbonyl groups of chloroformates. The product may be represented by the formula $$F(CF_2)_7CH_2-O-CO-Cl$$

*Example 3—1,1-dihydro-11-chloro-perfluoroundecyl chloroformate*

To 300 ml. of ethyl acetate cooled to −10° C., was added 59.4 g. of phosgene. A solution of 113.3 g. of 1,1-dihydro-11-chloro-perfluoroundecyl alcohol in 150 ml. of ethyl acetate was added rapidly. The mixture was warmed to 28° to 30° C., and a mixture of 15.8 g. of dry pyridine and 40 ml. of ethyl acetate was added dropwise, with vigorous agitation over a one-hour period at a reaction temperature of 28° to 30° C. The mixture was then agitated for an additional hour at 28° to 30° C.

The scrubbing off of the phosgene and isolation of the product was the same as described in Example 2.

The crude white powder was slurried at room temperature in a mixture of 850 ml. of n-hexane and 2000 ml. of petroleum ether. The slurry was filtered and the residue recrystallized from chloroform. This gave 26 g. of small white crystals, of M.P. 106° to 107° C. This was found to be the carbonate. The infrared spectrum of a Nujol mull (a sample of the product mulled in mineral oil) showed a strong sharp peak at 5.61μ for the carbonyl of the carbonate.

The filtrate was boiled down to 150 ml. on the steam bath and allowed to cool slowly to room temperature. Large, glistening, plate-like crystals were isolated; M.P. 62° to 63° C. The hydrolyzable chlorine was found to be 5.0% while theory is 5.64%. The infrared spectrum of a Nujol mull showed a strong sharp peak at 5.56μ for the carbonyl of the chloroformate. The product corresponds to the formula $$Cl(CF_2)_{10}CH_2-O-CO-Cl$$

*Example 4—1,1,13-trihydro-perfluorotridecyl chloroformate*

To 400 ml. of ethyl acetate cooled to −10° C., was added 104 g. of phosgene. A solution of 221 g. 1,1,13-trihydro-perfluorotridecyl alcohol in 200 ml. of ethyl acetate was added rapidly to the reaction flask. The mixture was warmed to 28° to 30° C., a mixture of 27.7 g. of dry pyridine and 40 ml. of ethyl acetate was added dropwise, and the mixture was then agitated for one hour at 28° to 30° C.

The scrubbing off of the phosgene and the isolation of the product was done as in Example 2.

The crude product, which was a white solid, was recrystallized from n-hexane, giving white crystalline plates, of M.P. 98° to 99° C. The analysis of this chloroformate showed 4.6% hydrolyzable chlorine compared with 5.1% for theory. The infrared spectrum of a Nujol mull of this compound showed a strong sharp peak at 5.57μ for the carbonyl of the chloroformate. The product has the formula $$H(CF_2)_{12}CH_2O-COCl$$

*Example 5—1,1-dihydro-perfluorooctyl carbamate*

179 g. of 1,1-dihydro-perfluorooctyl chloroformate from Example 2 above was added to 500 ml. of dry tetrahydrofuran. Gaseous ammonia was bubbled slowly into the water-white solution at a temperature of 20° to 30° C.

The ammonium chloride formed was filtered off, and the tetrahydrofuran was distilled off at 30° to 35° C. under reduced pressure. The white solid residue was recrystallized from 225 ml. of chloroform. The carbamate was isolated as flat, plate-like crystals, of M.P. 82° to 83.5° C.

A sample of this carbamate was again recrystallized from chloroform and now melted at 84° to 85° C.

*Analysis.*—Calculated for $CF_3(CF_2)_6CH_2O-CONH_2$: C, 24.4%; H, 0.90%; N, 3.16%; F, 64.3%. Found: C, 24.2%; H, 0.87%; N, 3.15%; F, 64.3%.

The carbamate had a cell length of $25.7 \pm 0.05$ A. by X-ray diffraction measurements. The infrared spectrum of a Nujol mull showed the following peaks: $2.91\mu$(M); $2.98\mu$(MW); $3.03\mu$(W); $3.12\mu$(VW); $5.86\mu$(S); $6.15\mu$(W); $6.20\mu$(MW).

*Symbols.*—VW=very weak; W=weak; MW=medium weak; M=medium; and S=strong.

*Example 6—1,1-dihydro-11-chloro-perfluoroundecyl carbamate*

To a suitable flask was added 86.0 g. of 1,1-dihydro-11-chloro-perfluoroundecyl chloroformate (from Example 3 above) and 300 ml. of dry tetrahydrofuran. The mixture was cooled to 17° C., and gaseous ammonia was bubbled into the solution, whereupon the solution became full of white solids. The reaction mixture was allowed to rise to room temperature and allowed to stand for 1½ hours.

The reaction mixture was then cooled in a salt-ice bath, and filtered with suction. The filtrate was distilled to dryness under vacuum, and the residue was extracted with ether.

The ether filtrate was boiled to dryness on a steam bath leaving 79.1 g. of crude carbamate. Upon recrystallizing the latter from 600 ml. of 95% ethanol containing a small amount of activated carbon, white, plate-like crystals were obtained, of M.P. 116.5° to 117.5° C. Distillation of this product showed a B.P. of 139° C. at 2.4 mm. pressure. The molecular weight by the boiling point rise method in acetone was found to be 593 and 584. Theory for $Cl(CF_2)_{10}CH_2O-CONH_2$ is 609.5.

*Example 7—1,1,13-trihydro-perfluorotridecyl carbamate*

To a suitable flask was added 166.7 g. of 1,1,13-trihydro-perfluorotridecyl chloroformate and 450 ml. of dry tetrahydrofuran. Gaseous ammonia was bubbled through the reaction mixture at a medium rate. The reaction was run at 22° to 30° C. for 1 hour and heated for an additional hour at 50° to 52° C. During this time, the solution became full of white solids.

The reaction mixture was cooled in an ice bath and filtered. The filtrate was concentrated to dryness using vacuum.

The residue was recrystallized from benzene. White, flat, plate-like crystals, of M.P. 133° to 134° C., were obtained. These were recrystallized from 95% ethanol. The resulting product melted at 132° to 133° C.

*Analysis.*—Calculated for $H(CF_2)_{12}CH_2O-CONH_2$: C, 24.9%; H, 0.74%; N, 2.1%; F, 67.5%. Found: C, 24.9%; H, 0.80%; N, 2.3%; F, 64.8%.

The infrared spectrum of a "Nujol" mull had the same principal peaks as the product of Example 5.

*Example 8—1,1,11-trihydro-perfluoroundecyl carbamate*

Ammonia gas was bubbled into a solution of 154 g. of 1,1,11-trihydro-perfluoroundecyl chloroformate in 400 ml. of dry tetrahydrofuran at 22°–23° C. for five minutes with stirring. The temperature was increased to 50° C. and the mixture was agitated with $NH_3$ bubbling through the mixture for an additional hour and 30 minutes. During this time, the mixture became full of white solids. The slurry was cooled and filtered; the tetrahydrofuran in the filtrate was boiled to dryness on the steam bath. The residue was fractionally crystallized from a large quantity of chloroform, which gave the following fractions:

(1) M.P. 109°–109.5° C.; 102.8 g. (69% of theory), large white plates
(2) M.P. 92°–99° C.; 12.0 g.
(3) M.P. 90°–92° C.; 6.1 g.

The infrared spectrum of fraction 1 confirmed the identity of the compound as 1,1,11-trihydro-perfluoroundecyl carbamate.

The novel compounds of this invention are useful for preparing oil- and water-repellency reagents. While the entire subject is taken up in full detail and claimed in our copending application, Serial No. 788,052 (of even date herewith), the following example will serve here to illustrate the general procedure.

*Example 9*

44.3 g. of 1,1-dihydro-perfluorooctyl carbamate (of Example 5 above), 3.0 g. of paraformaldehyde, 300 ml. of dry xylene and 0.1 g. of p-toluene-sulfonic acid monohydrate are heated together with agitation of 100° C. for 24 hours.

The xylene solvent is distilled off under vacuum. The residue is taken up in ether and washed with 5% NaOH. The ether is then washed with distilled water until the washings are neutral to pH indicator paper. The ether solution is dried over anhydrous magnesium sulfate. After boiling to dryness, the residue is recrystallized twice from chloroform, and has a M.P. of 55° to 59° C.

The infrared spectrum of a sample prepared as above showed it to be a mixture of two compounds. These two compounds were separated by distillation. After recrystallization from chloroform, the still residue had a M.P. of 57° to 60° C., and was shown by its infrared spectrum to be N,N'-methylene-di(methylene-bis-1,1-dihydro-perfluorooctyl carbamate), that is, a compound of the formula

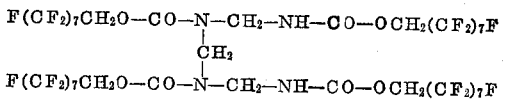

When a 5% solution in acetone of said methylene-di(methylene-bis-carbamate) compound was applied to cotton poplin and the latter was air dried and heated in an air oven for 3 minutes at 150° C., it was found to have acquired water repellency and oil repellency. Moreover, the oil repellency was of a very high rating and remained at the same high rating after 14 home laundering type washes and ironings. The fabric was also found to be resistant to soiling with a synthetic dry soil consisting of clay, iron oxide and carbon black.

The carbamates of Examples 6 to 8 above, when similarly reacted with paraformaldehyde, gave similar mixtures, in which one component when isolated and tested as above proved to have excellent, wash resistant, oil repellency properties, and good water repellency and soil repellency properties.

We claim as our invention:
1. Chloroformates having the structure

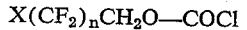

wherein X is a member of the group consisting of hydrogen, chlorine and fluorine, and *n* is an integer in the range of 7 to 12, inclusive.

2. Fluoroalkyl carbamates having the structure

wherein X is a member of the group consisting of hydrogen, chlorine and fluorine, and $n$ is an integer in the range of 7 to 12, inclusive.

References Cited in the file of this patent

UNITED STATES PATENTS

| | | |
|---|---|---|
| 1,640,506 | Leuchs | Aug. 30, 1927 |
| 2,527,240 | Baird et al. | Oct. 24, 1950 |
| 2,820,809 | Frevel et al. | Jan. 21, 1958 |

OTHER REFERENCES

Kaplan et al.: J.A.C.S., vol. 71, page 3259 (1949).

Oliverio: "J. Org. Chem.," vol. 20 pages 363 to 367 (1955).

Oliverio et al.: "J. Org. Chem.," vol. 20, pages 1733 and 1736 (1955).

Lovelace et al.: "Aliphatic Fluorine Compounds," 1958, page 265.